United States Patent [19]

Attucci et al.

[11] 4,068,998

[45] Jan. 17, 1978

[54] APPARATUS FOR PROCESSING CONTINUOUSLY-FED PLASTICS MATERIAL

[76] Inventors: Enrico Attucci; Fernando Attucci, both of Via Imprunetana 183, Mezzomonte, Impruneta, Florence, Italy, I-50023

[21] Appl. No.: 713,918

[22] Filed: Aug. 12, 1976

[30] Foreign Application Priority Data

Aug. 21, 1975 Italy .................................. 9525/75

[51] Int. Cl.² .......................................... B29C 17/04
[52] U.S. Cl. ................................ 425/317; 425/324.1; 425/387.1
[58] Field of Search ..................... 425/66, 317, 324 R, 425/392, 404, 405, 385, 387 R

[56] References Cited

U.S. PATENT DOCUMENTS

| | | | |
|---|---|---|---|
| 2,036,313 | 4/1936 | Zimmermann et al. | 425/66 X |
| 2,909,990 | 10/1959 | Judisch | 425/385 X |
| 2,928,124 | 3/1960 | Hugger | 425/385 X |
| 2,952,033 | 9/1960 | Goodwin | 425/445 X |
| 3,395,200 | 7/1968 | Mader, Jr. et al. | 425/66 X |
| 3,465,384 | 9/1969 | Barchi et al. | 425/317 X |
| 3,594,870 | 7/1971 | Schippers et al. | 425/66 |
| 3,632,252 | 1/1972 | Amberg et al. | 425/385 X |

*Primary Examiner*—Robert L. Spicer, Jr.
*Attorney, Agent, or Firm*—McAulay, Fields, Fisher & Goldstein

[57] ABSTRACT

Apparatus for processing continuously-fed plastics material in strip form comprises a cyclically operated working tool for example for welding and/or shearing the material. During operation of the tool, the material is stopped adjacent the working zone of the tool and a material storage loop is formed by the continuously incoming material. Subsequent to operation of the tool, the material is drawn from the loop at a higher speed than the infeed speed until the loop has been fully taken up and the material is stretched.

12 Claims, 20 Drawing Figures

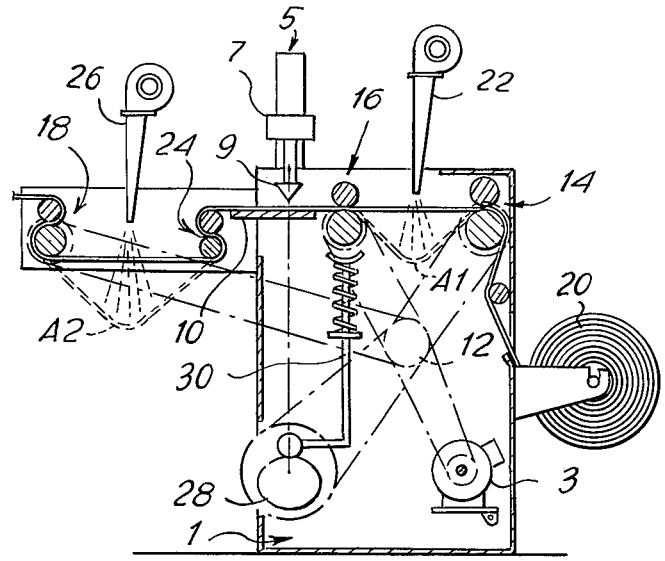
Fig. 1
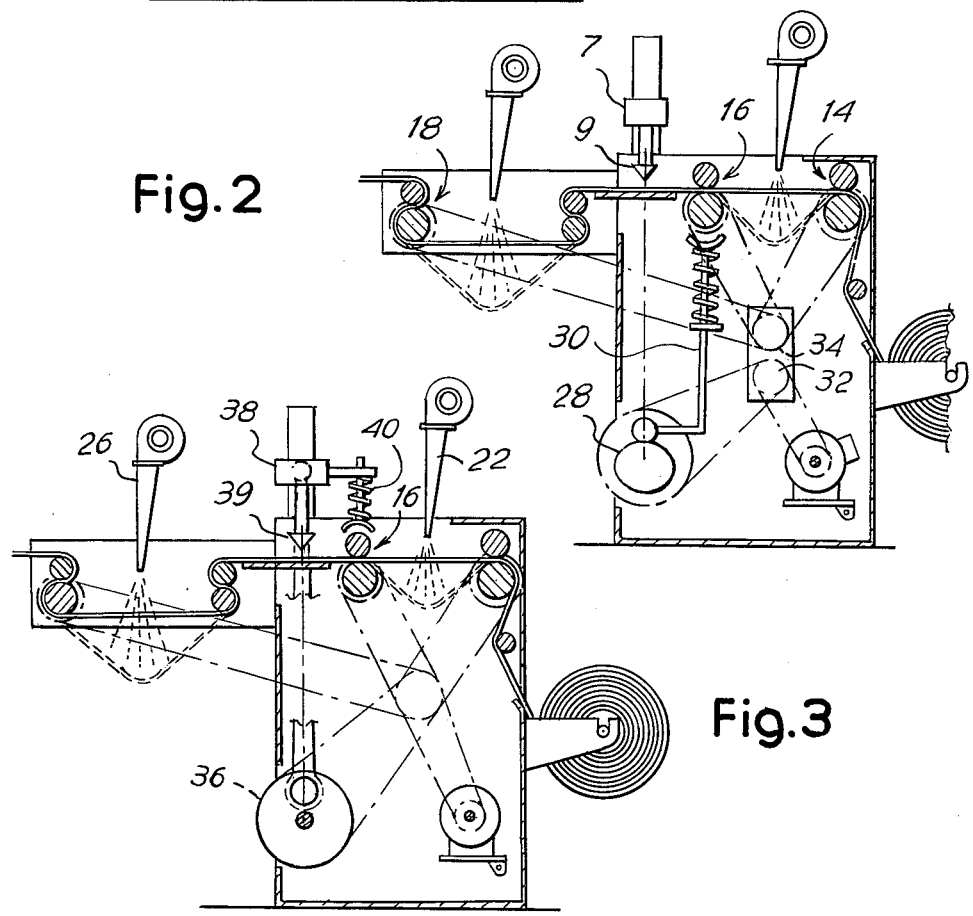
Fig. 2
Fig. 3

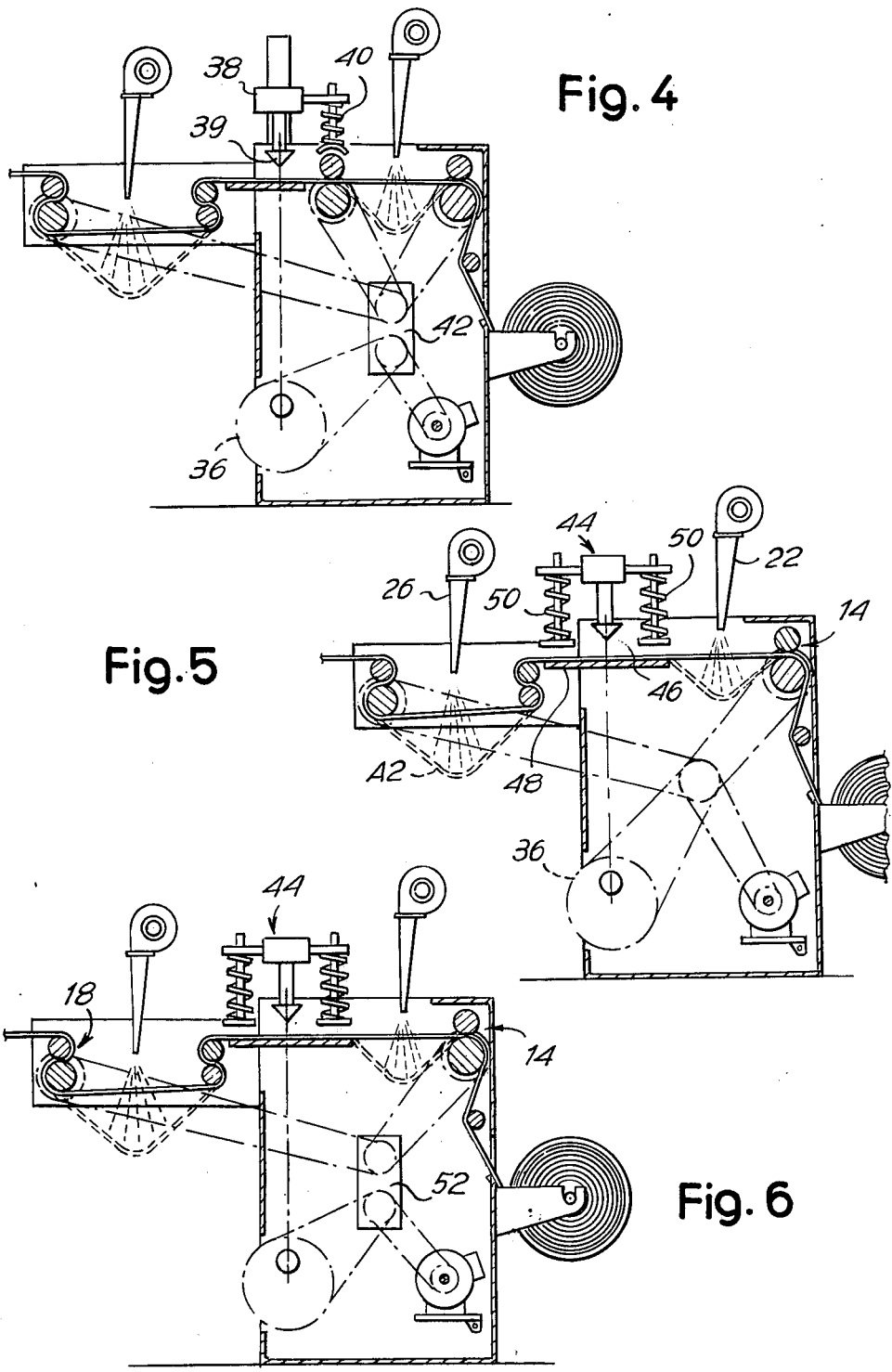

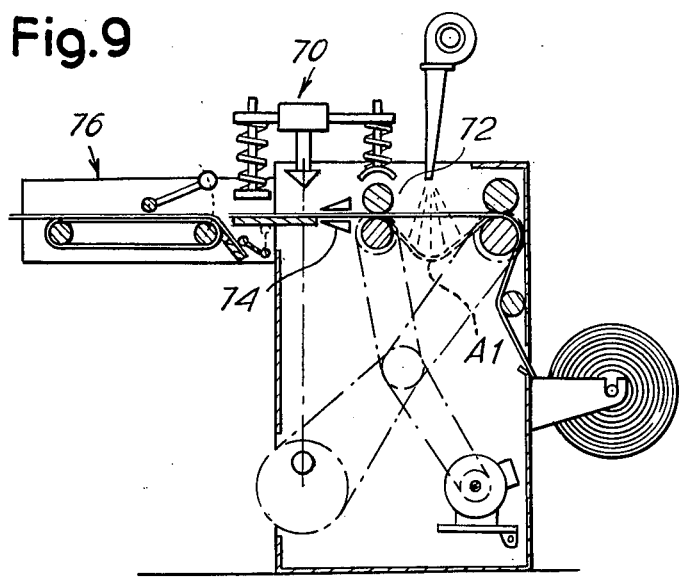
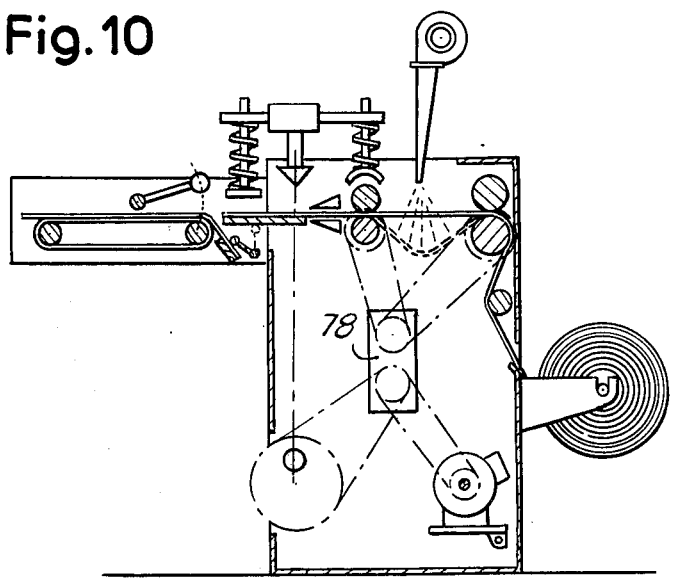

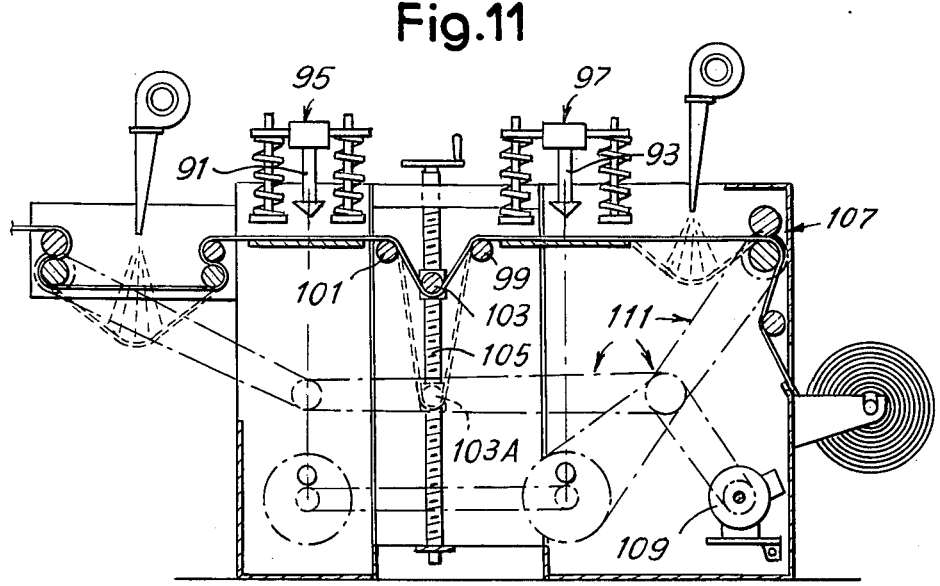
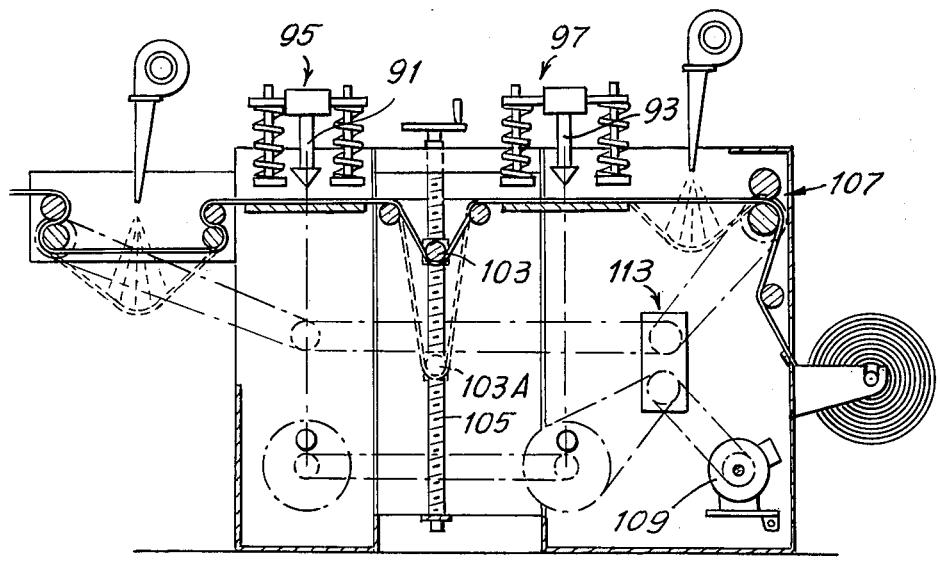

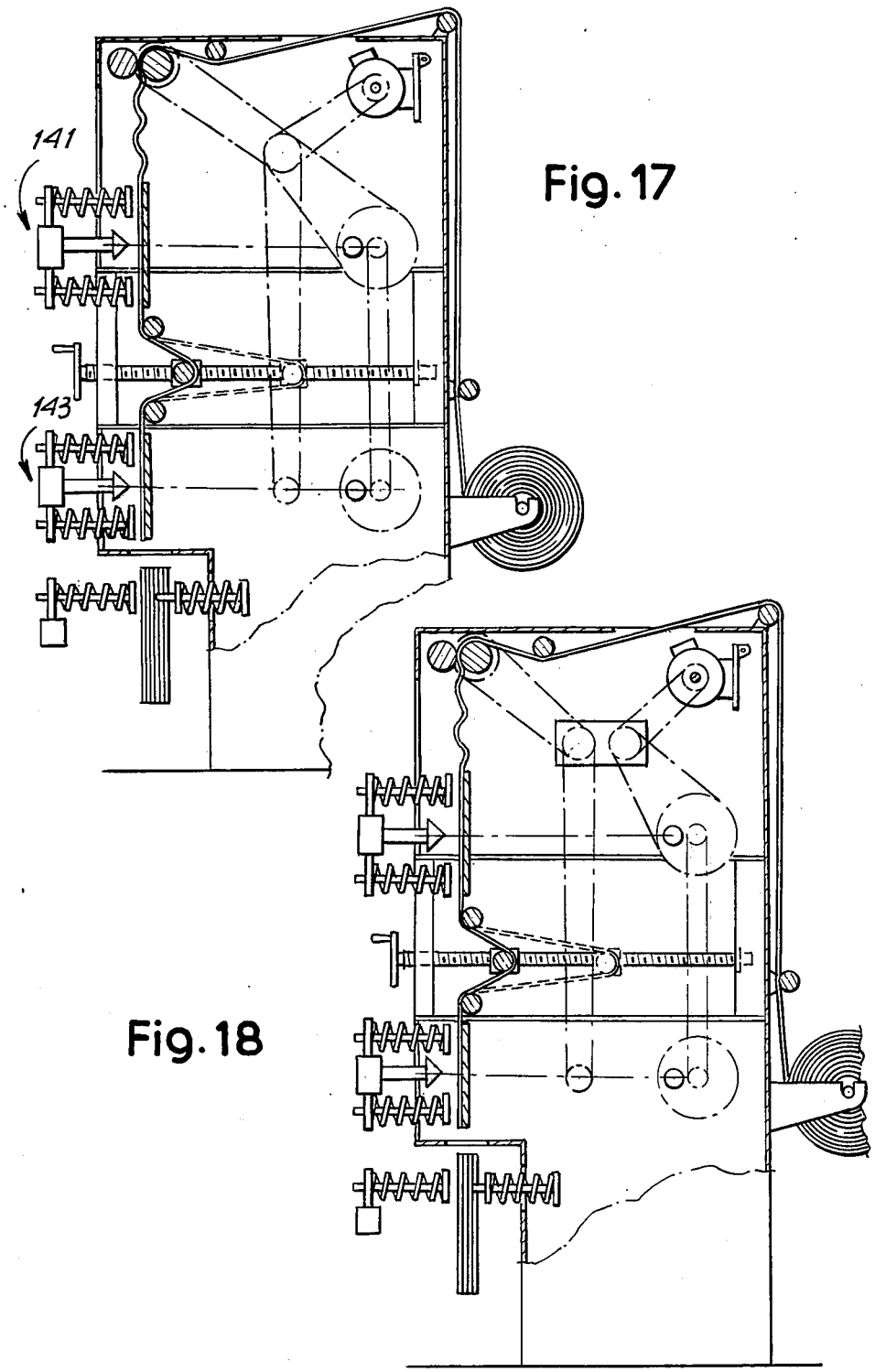

APPARATUS FOR PROCESSING CONTINUOUSLY-FED PLASTICS MATERIAL

FIELD OF THE INVENTION

The invention relates to apparatus for processing plastics material in strip-like form.

SUMMARY OF THE INVENTION

According to the invention, there is provided in apparatus for processing plastics material in strip-like form, means for continuously feeding the material, means defining a material feed path, tool means for performing a processing operation on the material in a working zone of the apparatus, means for cyclically operating the tool means, said material feed path being arranged to permit a material storage loop to be formed in a portion of the path, said portion being defined between the feed means and said working zone, means enabling the material to be drawn from the loop at a speed higher than the feed speed of the continuous feed means, and to be stretched on said portion of the path, and means for stopping the feed of the material in said working zone during operation of the tool means.

BRIEF DESCRIPTION OF THE DRAWINGS

Embodiments of the invention will now be described with reference to the accompanying diagrammatic drawings, in which:

FIGS. 1 to 20 are longitudinal sections each showing a different embodiment of the invention.

DESCRIPTION OF THE PREFERRED EMBODIMENTS

Figure 7:
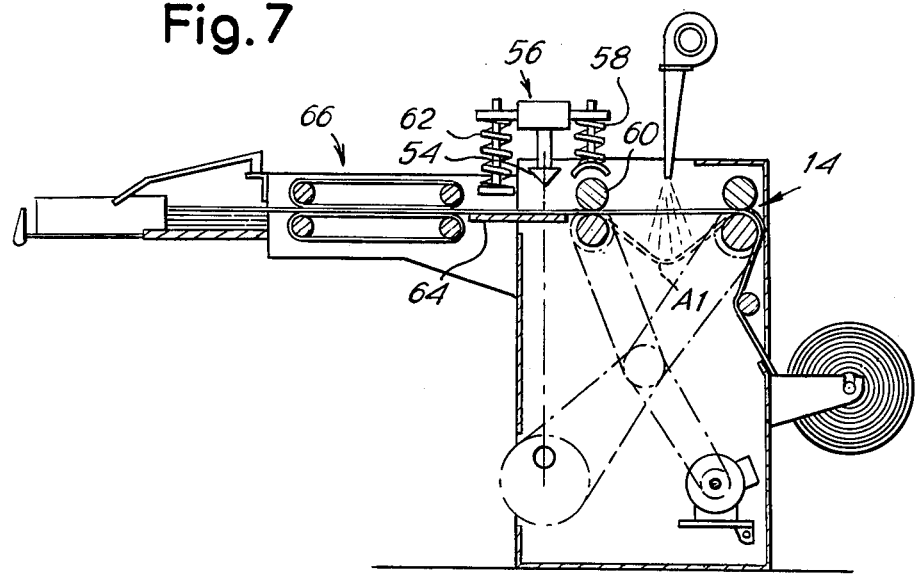

With initial reference of FIG. 1, the apparatus comprises a frame 1 which supports a motor 3 and means generally indicated at 5, for moving a unit 7 which carries a working tool 9; the latter may be formed by a welding bar with blade means for embossing, scoring, or shearing plastics strip material in the form of a tubular film, the tool cooperating with an underlying plane working surface 10. Through a common transmission 12, the motor 3 drives a first pair of feed rollers 14, a second pair of feed rollers 16 arranged upstream of the working zone of the tool 9, and a further pair of feed rollers 18 arranged downstream of the working zone of the tool 9. The pair of rollers 14 and the pair of rollers 18 rotate at the same peripheral speed to effect continuous feed of the material from a source which is shown in the form of a reel 20; alternatively the source may comprise an extruder which extrudes the material in the form of a tubular thermoplastics film. The pair of rollers 16 are driven at a higher peripheral speed than that of the rollers 14 and 18. The pair of rollers 16 may be driven via a drive which includes for example a friction coupling which permits the rollers 16 to be braked and stopped.

The tool 9 — such as a welding bar — may also include pressing members which, when the tool is lowered by the unit 7, resiliently press against the working surface 10, thus braking the material.

Between the pair of rollers 14 and the pair of rollers 16 there is provided a blower 22 which acts on the material to urge the material to form a first storage loop A1, the shape of which may be varied according to the requirements as hereinafter indicated. A second loop A2 is formed downstream of the working zone of the tool 9 in a portion of the material feed path between guide rollers 24, which are preferably idle rollers, and the feed rollers 18. In order to produce the second loop A2 there is provided a second blower 26; the shape of the second loop may likewise be varied.

From the transmission 12 there is taken a drive for a shaft carrying a cam 28. The cam 28 operates a unit 30 which acts as a friction brake for the pair of rollers 16 in order to stop the rollers 16 in spite of continuing drive from the transmission 12 to at least one of the rollers 16. The control of the unit 7 for the raising and lowering thereof and thus for the operation of the tool 9, may be effected by the shaft which carries the cam 28, and thus the braking action effected through the unit 30, and the control of the tool can be synchronized with each other. Therefore the feed of the material ceases during operation of the tool 9, and the feed resumes only after subsequent raising of the unit 7, and thus of the tool 9.

The material is drawn by the pair of rollers 14 from the reel 20 or by feed from a continuous feeder (which may also be the aforesaid extruder), and the material discharged from the apparatus is delivered at the same speed by the pair of rollers 18. In the path length between the pair of rollers 14 and the pair of rollers 18, the material undergoes stoppages and subsequent movements at a speed higher than that imposed by the pairs of rollers 14 and 18, in such a manner as to obtain an average speed through the apparatus which corresponds to the continuous and uniform inlet and discharge of the material at the inlet and exit ends of the apparatus. When the material is stopped (owing to the stopage of the rollers 16 by the cam 28 and by the brake unit 30), the material continuously fed by the pair of rollers 14 forms the loop A1, which is regularized by the by the blower 22; simultaneously the advance of the material downstream of the working zone of the tool 9 continues since the loop A2, which was previously formed using the blower 26, is progressively reduced in size owing to the continuous drive imposed on the material by the pair of rollers 18. When the pair of rollers 16 ceases to be braked, there is still a residual loop A2 which avoids stretching of the material, while the material stored in the loop A1, which is now larger than the loop A2, is recovered by the pair of rollers 16 which feed the material at a speed higher than that of the rollers 14. The loop A1 is fully taken up and the material between the pair of rollers 14 and the pair of rollers 16 is stretched. The rollers 16 may slip on, and be braked by, the stretched material which starts from the rollers 14. At this point, the cycle is resumed with the stoppage of the pair of rollers 16 and with a subsequent lowering of the unit 7 for subsequent welding and/or embossing operation.

It is to be noted that when the material is stopped, the material is accurately positioned since the material is stretched and under tension at the pair of rollers 16.

During the relatively quick advance of the material by the pair of rollers 16, the size of the loop A2 is increased again to store sufficient material to enable the material to be continuously delivered by the rollers 18 during a subsequent stoppage.

In a modified embodiment shown in FIG. 2, instead of the simple transmission 12 there is provided a speed variator 32 so arranged that the shaft of the cam 28 is driven at a constant speed, while by means of the variator 32 and a transmission 34 at the output side of the variator, it is possible to vary the speed of the rollers 14, 16 and 18 with respect to the operational frequency of the unit 7 which is synchronized with the cam 28 and thus with the braking unit 30. In this way, one varies the length of the material between successive operations of the tool 9 by varying the material advance speed with respect to the working frequency of the braking unit 30 and the unit 7. One may also reverse the arrangement, that is the working frequency of the tool and of the braking unit can be modified with respect to a constant advance speed.

In the embodiment in FIG. 3, a crank and connecting rod mechanism 36 which operates above an axis equivalent to the axis of the cam 28 of FIGS. 1 and 2 drives a unit 38, which carries a tool 39, at a frequency determined by the rotational speed of the crank. Braking means 40 comprising a resiliently biased brake shoe is carried directly by the unit 38 to brake the pair of rollers 16. By providing a suitable bias for the brake shoe, the deceleration of the material by the rollers 16 can be related in an appropriate manner with respect to the lowering of the unit 38.

In a modified embodiment shown in FIG. 4 there is provided an arrangement similar to that of FIG. 2, that is with a speed variator 42 and a crank and connecting rod mechanism for the unit 38.

In the hitherto illustrated embodiments, provision is made to accelerate the length of material between the rollers 14 and the rollers 16 and also downstream of the latter, by means of the rollers 16 which have a peripheral higher speed than that of the rollers 14; the rollers 16 also facilitate the withdrawal of the material from the loop A1 to reduce the size of the loop and to increase the size of the loop A2. This relatively fast advance of the material in the portion thereof between the rollers 14 and the loop A2 may also be obtained simply by tensioning the material by using a blower 26 which has a greater output power than that of the blower 22. In this case, subsequent to the stoppage of the material in correspondence of the working zone, the material is advanced and stretched by the action of the blower 26 (or by any other suitable means, even of a mechanical type) which forms the loop A2. Such an arrangement is shown in FIG. 5 wherein the mechanism 36 operates a unit 44 which has, in addition to a tool 46 which co-operates with a working surface 48, at least one, and preferably two, resilient pressing members 50. The pressing members 50 are arranged to co-operate with the surface 48 and one of the members 50 is located upstream of, and the other downstream of, the working zone of the tool 46. In this way, the lowering of the unit 44 and of the tool 46 effects the stoppage of the material by means of the members 50, while the subsequent raising of the unit 44 allows the material to be advanced and to be stretched between the pair of rollers 14 and the loop A2. In this arrangement, the rollers 16 are omitted and the relatively quick advance of the material from the loop A1 to the loop A2 is obtained as above stated by means of the action of the blower 26 or by any other suitable means.

FIG. 6 illustrates a modification of the embodiment of FIG. 5 wherein there is provided a speed variator to modify the speed of the pairs of rollers 14 and 18, which rotate at a common speed, with respect to the frequency of operation of the unit 44.

In the FIG. 7 embodiment, there is provided means for tearing the material being embossed and welded by a tool 54 carried by a unit 56 which is operated by a crank mechanism similar to that described above. In this arrangement, there is provided a resilient brake 58 acting on a pair of rollers 60, similar to the rollers 16, which can be driven, via a sliding or slipping coupling, at a higher peripheral speed than that of the rollers 14. A pressing member 62 is provided on the unit 56 to directly act on the material by pressing it against a working surface 64 with which the tool 54 also co-operates. Downstream of the working surface 64 and thus downstream of the brake 58, the pressing member 62, and the tool 54, there is provided tearing means 66 (known per se) which separates, by a tearing action, the lengths of material embossed or scored by the tool 54, and stores the different lengths in a manner known per se.

Figure 8:
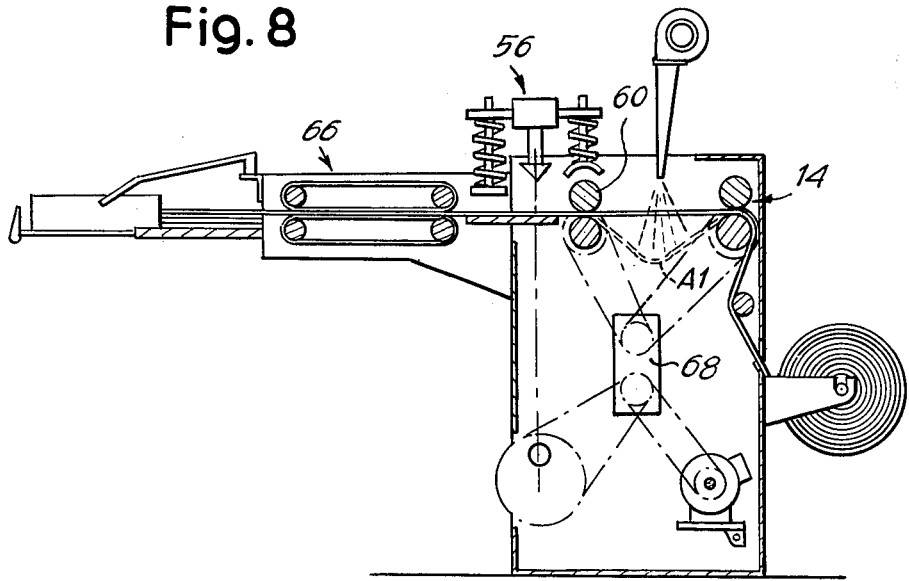

The modified embodiment of FIG. 8 is similar to that of FIG. 7 with the addition of a speed variator 68 to enable the speed of the rollers 60 and 14 to be varied with respect to the frequency of operation of the unit 56.

The lowering of the unit 56 causes, by braking the rollers 60, the stoppage of the material in the working zone of the tool and the formation of the loop A1; on subsequent raising of the unit 56, the pair of rollers 60 causes a quick advance of the material stored in the loop A1 and a stretching of the material between the pair of feed rollers 14 and griping means of the tearing means 66, while the tearing means 66 effects the detachment of the length either owing to the resistance offered to the advance by the rollers 60, or by the stretching of the material between the rollers 14 and the gripping means.

The embodiment of FIG. 9 provides for the forming of a loop by means of a shearing action effected by a shearing and welding tool mounted on a unit 70 driven at a constant frequency. The apparatus includes a resilient brake for a pair of quick advance rollers 72 which stretch the material when the unit 70 is raised and which stop the material when they are braked by the lowering of the unit 70, thus resulting in the formation of, or an increase in the size of, the loop A1. The material sheared by the tool carried by the unit 70 is advanced by nozzles 74 to be stored in storing means 76 of a per se known type, arranged downstream of the working zone of the welding and shearing tool which forms the material into bags. In the embodiment of FIG. 9, the material is fed at constant speed whereas in a modified embodiment shown in FIG. 10, there is provided a speed variator 78 which allows the speed of the material to be varied with respect to the frequency of operation of the unit 70, and thereby dimensions of the bags produced by the apparatus may be varied.

In the above embodiments the length of the material defined between successive operations of the working tool is dependent upon the average speed of the material with respect to the control frequency of the tool unit.

In the embodiments now to be described, the apparatus comprises two (or more) welding bars and/or shearing tools spaced along the path of the material by a distance equal to the length of the bags or other articles to be formed from the material. At each cycle a length of material equal to the length of the article times the number of tools is drawn from the reel and at each cycle a corresponding number of articles is produced. This arrangement is particularly suitable for the production of articles of which the dimension measured in the longitudinal direction of the material (for instance between adjacent welds) is relatively small.

The embodiments of FIGS. 11 and 12 comprise two tools, such as welding bars 91 and 93 carried by units 95 and 97 having pressure-applying means. In order to define the path of the material between the two tools there are provided guide rollers 99, 101 having a fixed axis, and a guide roller 103 which is adjustable in position by means of a threaded rod 105. By means of the rod 105, the roller 103 can be moved for example from the position shown in solid lines in FIGS. 11 and 12 to the position 103A shown in dotted lines. The material is advanced by a pair of feed rollers similar to those of the preceding embodiments, which are driven by a motor 109 via a drive which, in the embodiment of FIG. 11 is a fixed ratio drive 111 preferably having replaceable components, and which, in the embodiment of FIG. 12, is a variable speed drive comprising a speed variator 113 operating in a similar manner to the variators described above. In both embodiments the rollers 107 are driven to feed in one cycle a length equal to twice that of the articles to be formed, the length of an article corresponding to the path length of the material between the tools 91 and 93, which carry out the same operation on the material. The two tools are operated in a synchronized manner.

Between the pair of rollers 107 and the tool 93, a material loop may form corresponding to the development of the material of two articles.

Figure 13:
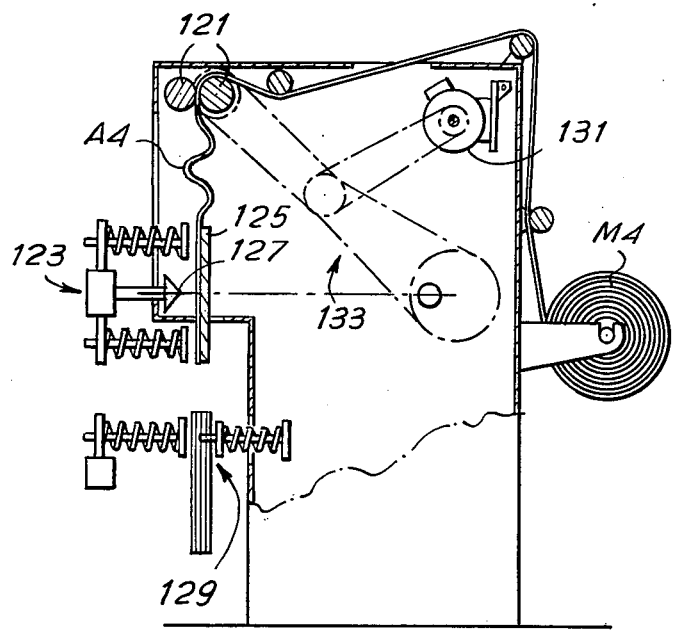
Figure 14:
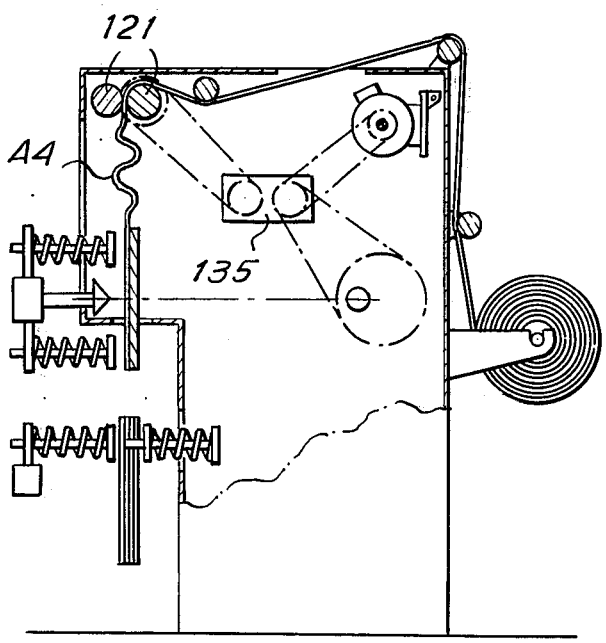
Figure 15:
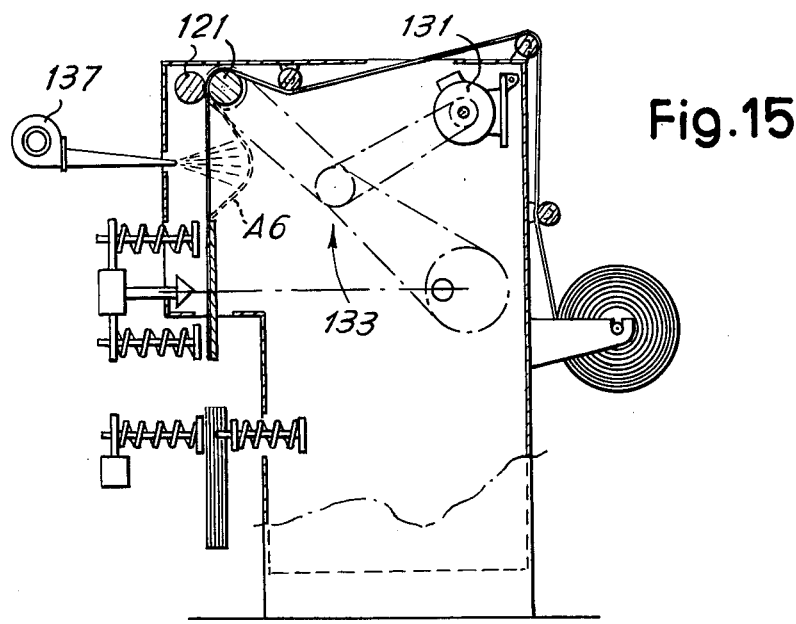
Figure 16:
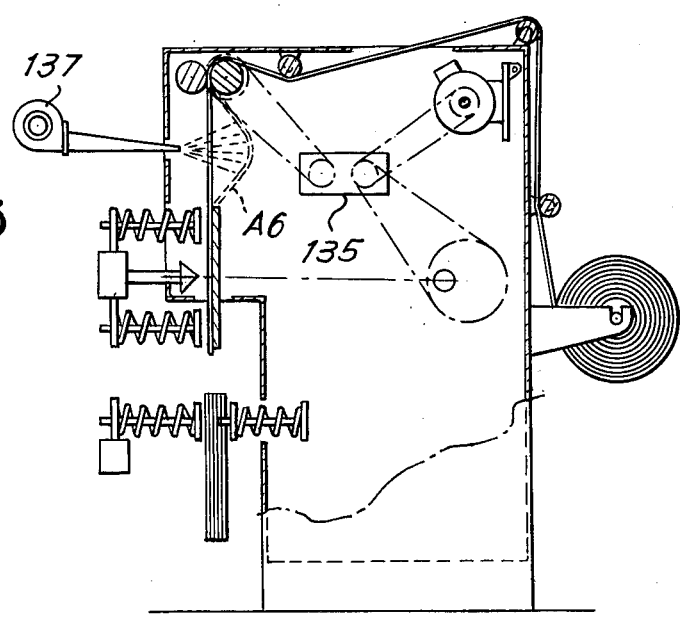
Figure 19:
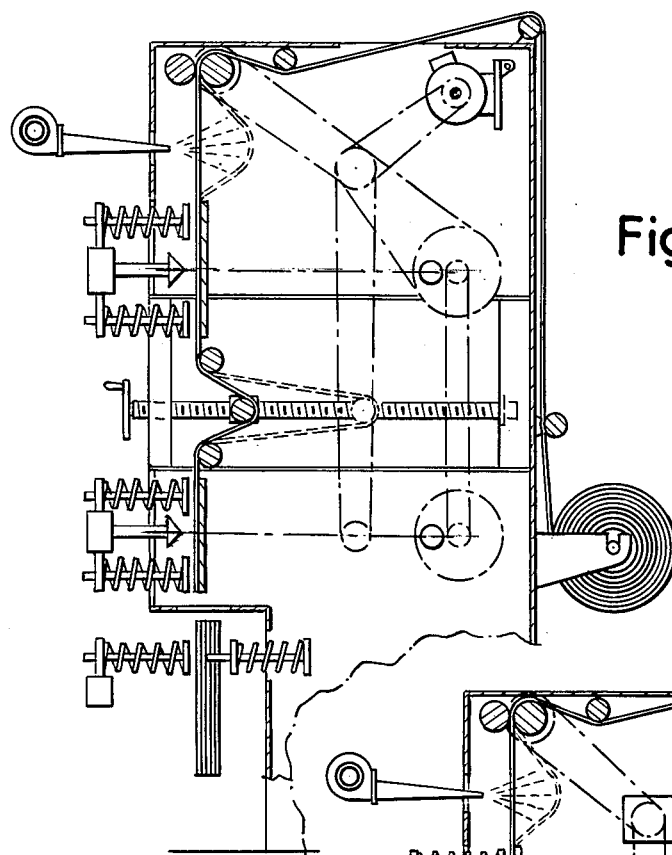
Figure 20:
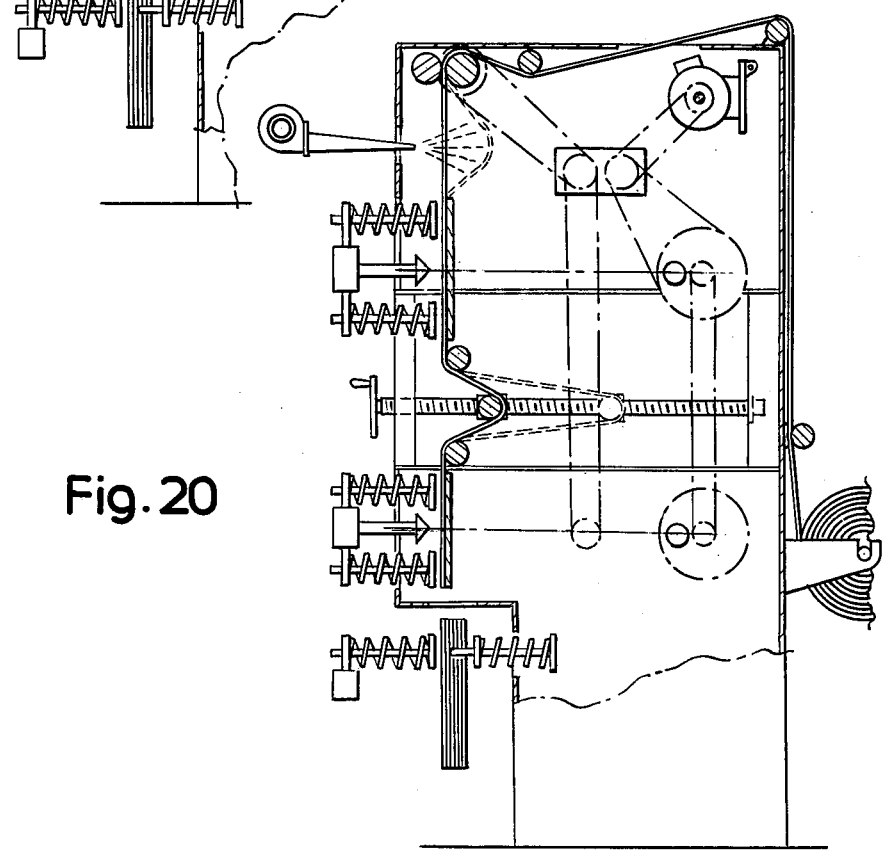

FIGS. 13, 14, 15 and 16 show embodiments of the apparatus in which the material is fed in a generally vertical path through the working zone of the apparatus, and the tools are movable horizontally. The material coming from a reel M4 is fed by a pair of rollers 121, and passes generally vertically between a tool-holder unit 123 and an opposing working surface 125, the unit 123 carrying for example, shearing and/or welding blades 127. The articles are stored in a per se known manner by storage means 129. The rollers 121 are driven by a motor 131 which also operates the unit 123. According to FIGS. 13 and 15 there is provided a replaceable fixed-ratio drive 133; in the embodiments of FIGS. 14 and 16 there is provided a speed variator 135, from which the drive for the feed rollers 121 is obtained. As shown in FIGS. 13 and 14 a loop of material A4 is formed which is urged downwards between the tool 127 and the surface 125 either by free fall of the material due to gravity or by suitable entraining means. According to FIGS. 15 and 16 loops of material A6 are formed and are controlled in size by blower means 137.

In the embodiments of FIGS. 17 to 20, there is provided a vertical path similar to that of FIGS. 13 to 16, but with an arrangement which includes two toolholder units 141 and 143 with functions corresponding to those of the two units provided in the embodiments of FIGS. 11 and 12. In FIGS. 17 and 18 there are formed free loops similar to those of FIGS. 13 and 14, while in FIGS. 19 and 20 the loops are formed by blowers as in FIGS. 15 and 16. There is provided means between the two units 141 and 143 to obtain the desired path length of the material between these two units, to which the length of the articles to be obtained corresponds; this path length may be modified using a movable roller as described in connection with FIGS. 11 and 12.

According to a further embodiment (not shown), the control for the pressing means and the tool can be obtained by a suitable pneumatic system.

In the embodiments particularly described, the apparatus is relatively simple and enable the material to be fed in a uniform manner from a material source, for example a reel or an extruder. In addition, the apparatus is relatively quiet in operation.

We claim:

1. In an apparatus for processing plastics material in strip-like form including either embossing, scoring or shearing plastics strip material.
    means for continuously feeding the material, means defining a material feed path,
    tool means for performing a processing operation on the material in a working zone of the apparatus,
    means for cyclically operating the tool means,
    said material feed path being arranged to permit a material storage loop to be formed in a portion of the path and to remove the material storage loop,
    said portion being defined between the feed means and said working zone,
    means enabling the material to be drawn from the loop at a speed higher than the feed speed of the continuous feed means to remove the material storage loop, and to be stretched in said portion of the path, and means for braking the material in the material feed path and for stopping the feed of the material in said working zone during operation of the tool means.

2. Apparatus according to claim 1, wherein the means enabling the material to be drawn from the loop is arranged upstream of said working zone.

3. Apparatus according to claim 2, further comprising a mechanical drive system for the feed means and the tool-operating means, said device system including means for varying the drive ratio between the feed means and the tool-operating means.

4. Apparatus according to claim 1, wherein the tool means comprises two tools spaced along the feed path, and the said means enabling the material to be drawn from the loop is arranged to advance the material through a distance equal to twice the spacing between the tools.

5. Apparatus according to claim 4, further comprising means for adjusting the path length of the material between the two tools.

6. Apparatus according to claim 1, wherein
    the feed means comprises first roller means, and
    the means enabling the material to be drawn from the loop comprises second roller means,
    said second roller means being driven at a higher peripheral speed than the first roller means to remove the material storage loop formed in the portion of the path.

7. Apparatus according to claim 6, wherein
    the means for braking the material and for stopping the feed of the material comprises means for braking the second roller means.

8. Apparatus according to claim 6, wherein the second roller means is arranged to slip on the stretched material.

9. Apparatus according to claim 1, wherein said material feed path is arranged to permit formation of a second material storage loop on a portion of the path downstream of the working zone such that material can be drawn from the second loop to permit continuous discharge of the material while the feed of the material is stopped in the working zone.

10. Apparatus according to claim 9, further comprising means arranged to act on the material to increase the size of the second loop.

11. Apparatus according to claim 1, wherein at least a part of the material feed path extends generally vertically downwardly whereby the material can be drawn from the first loop and be stretched by gravitational action.

12. Apparatus according to claim 1, including:

an underlying plane working surface in said material feed path, and said tool means including a tool and means to lower said tool onto the material for embossing, scoring or shearing thereof, and said tool means including means resiliently pressing the material against said underlying plane working surface to brake the material.

* * * * *